United States Patent [19]

Masden et al.

[11] Patent Number: 5,261,051
[45] Date of Patent: Nov. 9, 1993

[54] METHOD AND SYSTEM FOR OPEN FILE CACHING IN A NETWORKED COMPUTER SYSTEM

[75] Inventors: Kenneth E. Masden, Redmond; Jon D. Smirl; John W. King, both of Kirkland; Darryl E. Rubin, Redmond, all of Wash.

[73] Assignee: Microsoft Corporation, Redmond, Wash.

[21] Appl. No.: 394,384

[22] Filed: Aug. 14, 1989

[51] Int. Cl.⁵ .......................................... G06F 15/16
[52] U.S. Cl. .................... 395/200; 364/228.4; 364/242.94; 364/284; 364/284.4
[58] Field of Search .......... 395/600 MS, 650 MS, 395/200 MS, 600, 650, 200

[56] References Cited

U.S. PATENT DOCUMENTS

| | | | |
|---|---|---|---|
| 4,780,821 | 10/1988 | Crossley | 364/200 |
| 4,791,566 | 12/1988 | Sudama et al. | 364/200 |
| 4,825,354 | 4/1989 | Agrawal et al. | 364/200 |
| 4,887,204 | 12/1989 | Johnson et al. | 364/200 |
| 4,891,785 | 1/1990 | Donohou | 364/900 |
| 4,914,570 | 4/1990 | Peacock | 395/650 |
| 5,008,853 | 4/1991 | Bly et al. | 364/900 |
| 5,109,519 | 4/1992 | Zimmet et al. | 395/800 |
| 5,113,519 | 5/1992 | Johnson et al. | 395/600 |

FOREIGN PATENT DOCUMENTS

A0278315 8/1988 European Pat. Off.

OTHER PUBLICATIONS

J. H. Morris et al., "Andrew: A Distributed Personal Computing Environment," *Communications of the ACM*, vol. 29, No. 3, Mar. 1986, New York, pp. 184-201.

S. J. Mullender, "A Distributed Concurrency Based on Optimistic Concurrency Control," *Proceedings of the Tenth ACM Symposium on Operating Systems Principles*, Dec. 1-4, 1985, Orcas Island, WA, pp. 51-62.

*Primary Examiner*—Kevin A. Kriess
*Attorney, Agent, or Firm*—Seed and Berry

[57] ABSTRACT

A method and means for improving the performance of distributed computer systems including a file server and a plurality of remote workstations. A system workstation issues a request from one of the remote workstations to open a batch file resident on the file server in a sharing mode. The request is automatically converted into a request to open the file in an OPlocked/OPbatched exclusive mode. The file server then determines whether the requested batch file has been opened by another workstation. The requested file is opened in an OPlocked/OPbatched exclusive mode if the requested file is not currently open, wherein the batch file is copied to a workstation and executed locally while keeping the batch file open on the file server. The file is opened in a sharing mode if the requested batch file is currently open. The batch file is written to the file server and closed and the system reverts to a sharing mode if the batch file is opened in the OPlocked/OPbatched exclusive mode and the batch file is requested by another of the system workstations.

8 Claims, 10 Drawing Sheets

METHOD AND SYSTEM FOR OPEN FILE CACHING IN A NETWORKED COMPUTER SYSTEM

RELATED APPLICATIONS

The present invention is related to U.S. patent application Ser. No. 07/394,324, entitled "Method And System For Opportunistic Locking In A Local Area Network," invented by the inventors of the present invention, filed of even date herewith are assigned to the assignee of the present invention now abandoned.

FIELD OF THE INVENTION

This invention relates to the field of computer networks and, more specifically, to a method and means for improving the speed and performance of a networked computer system while executing batch files.

BACKGROUND OF THE INVENTION

Computer networks are a well-known computer architecture wherein users of the network are typically located in many diverse locations. Computer networks are adapted for use with independent computer systems, each having local file storage capability, as well as diskless, terminal-type systems wherein master files are stored on a single file server.

One popular use for distributed computer systems is the sharing of batch files. For example, in many networked computer systems it is desirable that certain batch files be maintained by a system administrator so that all clients of the system may have access to updates or modifications of the batch files. In many networked systems, batch files are maintained on a system file server. Batch files are typically executed one line at a time and the batch file must be closed prior to execution. This is because of a property of batch files which allows batch files to add commands to, rename and delete themselves, etc. For example, while executing a batch file remotely, a client first issues a request to open the batch file. The file server then responds by acknowledging the batch file is available and open. The workstation then issues a request to seek the batch file for a requested line in the batch file. The file server then responds with a message when the seek operation is complete. The workstation then issues a request to read the line of the batch file and the file server responds by sending the requested data. The workstation then sends a message to the file server to close the batch file. The file server responds when the batch file is closed. The batch file line is then executed. Therefore, whenever a batch file is executed by a remote workstation, a total of eight messages are transmitted between a workstation and a file server for each line in the batch file. Accordingly, every time a batch file is executed by a remote workstation in a distributed processing system, a significant amount of network traffic results for each line in a batch file.

The present invention overcomes the above-identified problem by providing a method and means for opening a batch file on a file server, and copying the entire batch file to a remote workstation. The batch file is then locked open in an opportunistic locked mode on the file server. Once copied to the remote workstation, the batch file is cached and processed locally, thus eliminating the network traffic normally associated with batch file execution. Once the batch file has been entirely executed, it is unlocked and closed on the file server.

SUMMARY AND OBJECTS OF THE INVENTION

In summary, the present invention contemplates a method and means for improving the performance of distributed computer systems including a file server and a plurality of remote workstations. In operation, a system workstation issues a request from one of the remote workstations to open a batch file resident on the file server in a sharing mode. The request is automatically converted into a request to open the file in an OPlocked/OPbatched exclusive mode. The file server then determines whether the requested batch file has been opened by another workstation. The requested file is opened in an OPlocked/OPbatched exclusive mode if the requested file is not currently open, wherein the batch file is copied to a workstation and executed locally while keeping the batch file open on the file server. The file is opened in a sharing mode if the requested batch file is currently open. The batch file is written to the file server and closed and the system reverts to a sharing mode if the batch file is opened in the OPlocked/OPbatched exclusive mode and the batch file is requested by another of the system workstations.

BRIEF DESCRIPTION OF THE DRAWINGS

These and other objects may be fully understood through the detailed description below and the accompanying drawings in which.

DETAILED DESCRIPTION OF THE INVENTION

Figure 1:
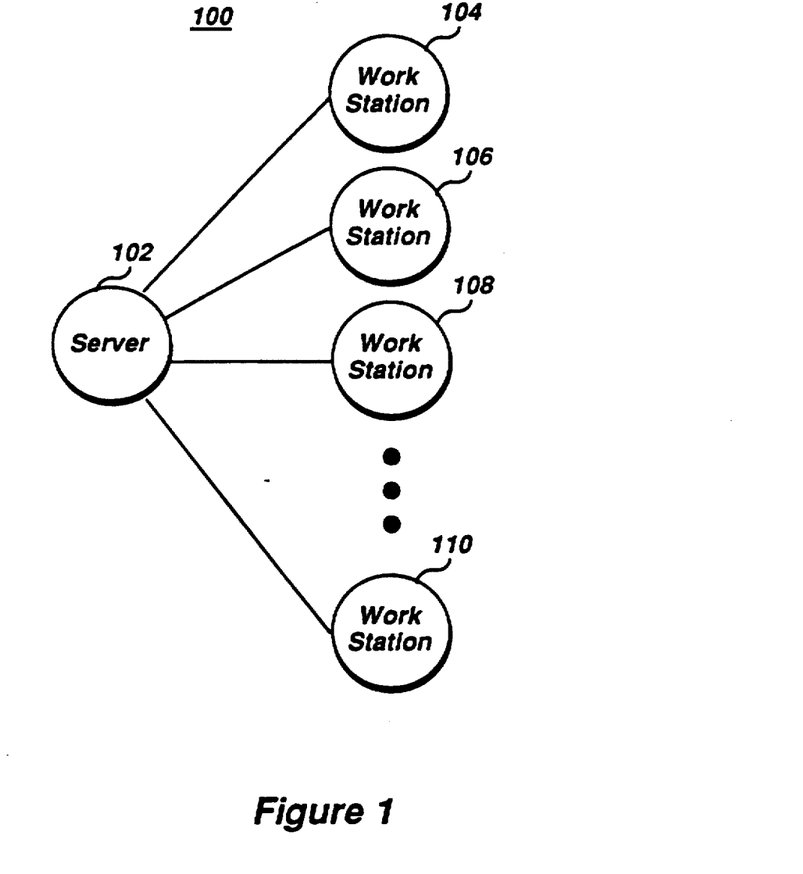
FIG. 1 is a diagram of a typical local area network system.

While the principles of the present invention may be applied to virtually any distributed computer system, the present invention is particularly adapted for use with local area network (LAN) systems of the type shown in FIG. 1. LAN systems are particularly adapted for multiuser applications, one example of which are systems which provide common storage of batch files for execution by remote computers or workstations. In the system 100, a file server 102 provides file services to a plurality of remote workstations 104, 106, 108 and 110. While the system 100 is shown with four workstations, those skilled in the art will appreciate that LAN systems are adapted for use with virtually any number of workstations. Furthermore, the system 100 is shown with each workstation directly coupled to the file server 102. The present invention is adapted for use with all types of networked systems regardless of the method used to interface the file server and workstations. In the context of the present invention, users of the LAN system are referred to as clients and file services refers to various file management tasks, such as opening, reading, seeking, and closing files. In the context of the present invention, the terms "file" or "files" refers to any collection of information or data regardless of size or whether the information or data is merely a portion or subset of a larger collection of information or data. The principles of the present invention may be applied to any collection of information accessed in a distributed manner.

Figure 2:
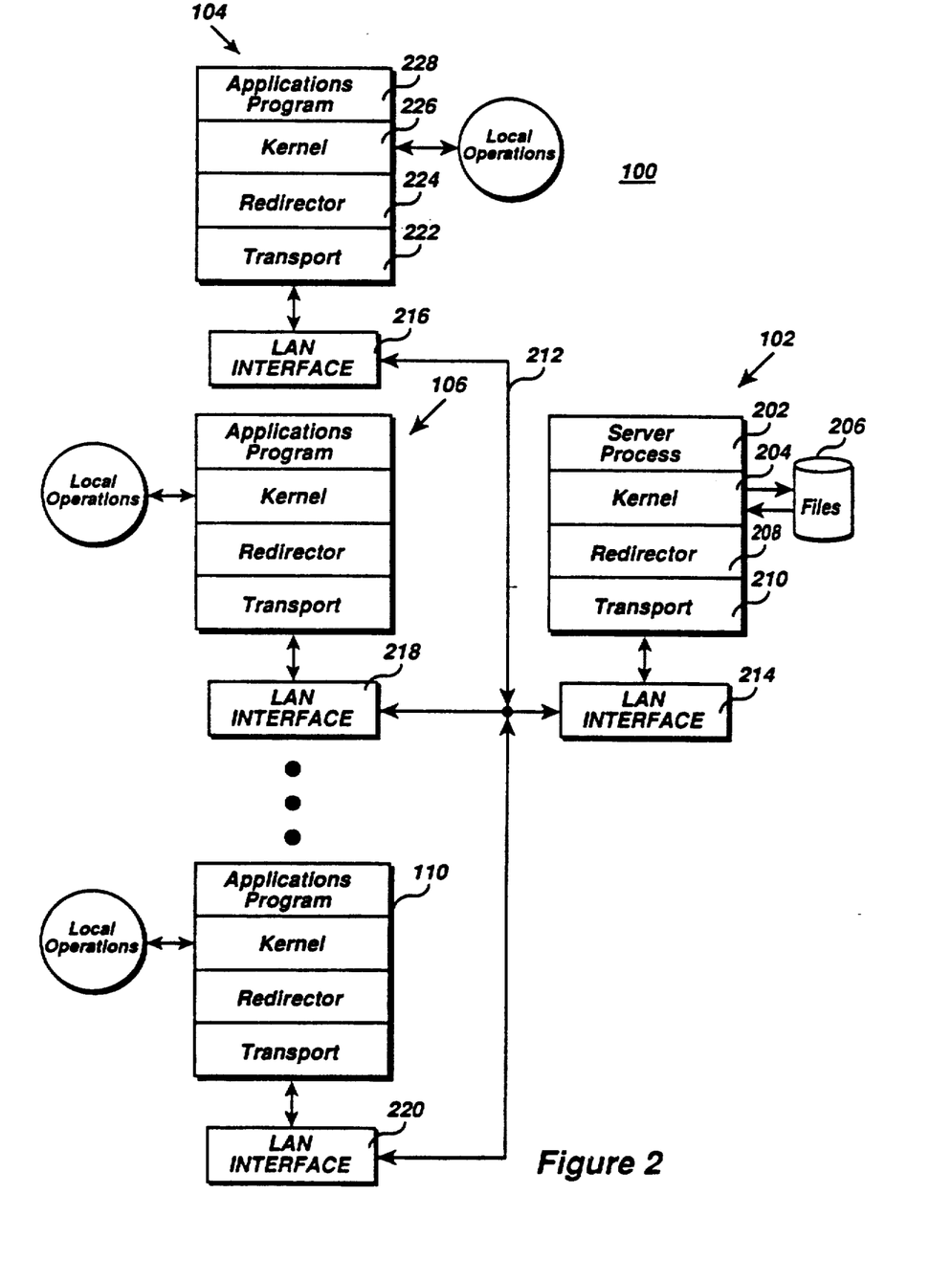
FIG. 2 is a more detailed diagram of the system of FIG. 1.

A more detailed diagram of the system 100 is shown in FIG. 2. While the present invention is described herein in the context of a LAN system, the principles of the present invention may be applied to any type of distributed computer system. The present invention is adapted to operate with many known LAN systems and the LAN system 100 is preferably modeled after the well-known LAN architecture described in ISO specification ISO 7498 entitled "Open Systems Interconnection—Basic Reference Model." LAN system principles are also described in a text: Tannebaum, "Computer Networks," Prentice-Hall, Inc., 1987, ISBN-O-B-165183-8. The LAN system principles described in the above-mentioned publications are well known to persons of ordinary skill in the art. Briefly, however, the file server 102 comprises a server process 202 which cooperates with a kernel 204 to receive, generate, and process system requests. The kernel further cooperates with a means 206 which provides storage for system files. The kernel 204 communicates with the network through a redirector 208 and a transport 210. The redirector 208 and transport 210 are responsible for monitoring message traffic on the LAN, for communicating LAN messages to the kernel 204 and server process 202, and for packaging and returning messages or data from the kernel 204 and server process 202 to the LAN.

The file server 102 is coupled to LAN communication lines 212 through a LAN interface 214. The LAN interface converts the messages and data processed by the file server 102 into a form consistent with the communications protocol of the LAN network. One such LAN protocol is Ethernet. A plurality of workstations 104, 106, 110 are further coupled to LAN communication lines through LAN interface devices 216, 218, and 220, respectively. Each respective workstation comprises a transport 222, a redirector 224, a kernel 226 and application programs 228. It is anticipated that each workstation used with the LAN system is capable of independent or local operations as well as being able to access and modify files resident on file server 102.

In prior LAN systems, workstations are operated in a sharing mode wherein all batch files are maintained on a file server, and are accessible to all clients simultaneously. In this mode, workstations issue requests to the file server to open a batch file resident on the file server. The file server then sends a response message indicating the batch file is available and open. The workstation then issues a request to seek the batch file for a requested line in the batch file. The file server then responds with a message when the seek operation is complete. The workstation then issues a request to read the line of the batch file and the file server responds by sending the requested data. The workstation then sends a message to the file server to close the file. The file server responds when the batch file is closed. The batch file line is then executed. Therefore, in the sharing mode, every time a line in a batch file is executed by a workstation, as many as eight messages may be communicated between the workstation and the file server. This model is based on the assumption that many workstations may be working with a single file at the same time and thus, the file must be maintained at a single location, i.e., the file is typically resident on the file server so that all clients in the system have access to file records. Further, since batch files may extend, rename, or delete themselves, as well as providing several other functions, it is necessary for the batch file to be closed prior to executing any portion of the batch file.

The present invention overcomes the problem of network overhead caused by remote execution of batch files by providing for the transfer of batch files in an opportunistic locked (OPlocked) and an opportunistic batched (OPbatched) mode wherein requests for executing batch files are automatically converted into requests for executing batch files in the OPlocked/OPbatched mode of the present invention. In the OPlocked/OPbatched mode of the present invention, if a batch file is not currently in use, the batch file is temporarily locked open on the file server and the batch file (or a portion thereof) is copied to the requesting workstation. The batch file is then executed locally, thus eliminating the network overhead caused by remote execution of batch files. If another workstation requests access to the batch file, the OPlocked/OPbatched batch file is written back to the file server so that all clients have access to the most recent version of the batch file. The system then reverts to a conventional sharing mode. For the purpose of simplifying the explanation of the operation of the present invention, the explanation herein refers to the transfer of batch files. Those skilled in the art will appreciate that complete batch files are rarely transferred and in most applications, only portions of batch files are actually transferred between the file server and the associated workstations.

As in prior systems, in the sharing mode it is assumed that a plurality of users may be modifying a single batch file simultaneously and the master file is not moved from the file server. In the OPlocked/OPbatched exclusive mode of the present invention, a batch file (or a portion thereof) is copied to a workstation to be processed and cached locally and the file is automatically OPlocked/OPbatched. When the client is completed with the batch file, the updated file is then written to the file server. However, if another workstation requests the batch file on an OPlocked/OPbatched file, the file server sends a message to the workstation currently owning the batch file to return the updated batch file to the file server and revert to a sharing mode.

According to the principles of the present invention, when a workstation requests sharing mode batch file services for a batch file, the sharing mode request is converted into a request for operation in an OPlocked-/OPbatched exclusive mode. The file server then determines whether the batch file is currently open. If not, the file server opens the batch file in the OPlocked/OPbatched exclusive mode, even if exclusive mode operation is not requested by the client. Therefore, batch file services are efficiently provided to clients in a manner which is totally transparent to the client. While the present invention is illustrated as a modification to workstation and file server operating systems, those skilled in the art will appreciate that the present invention could also be implemented within cooperating application programs.

The following pseudo-code describes the operation of the OPlocked portion of the present invention.

```
Workstation:
If file open request (of a batch file) is for
sharing_mode then
    if this is not a batch file
        send server request for open with
        OPlock/OPbatch
        OPbatch does not apply
    else (this is a batch file)
        If the file is psuedo-closed then
            reopen it locally
        else
            send server request for open with
        OPbatch
else (open is for exclusive mode)
    send server a normal open request
    OPlock and OPbatch do not apply
```

When the server returns the open request the server will indicate if the file has been OPlocked and OPbatched. If the file is OPbatched, then it must also be OPlocked. If the file was not OPbatched then proceed as normal for a sharing mode open

```
else (the file is OPbatched)
    The file can be treated as an exclusive open.
    This means the workstation can perform:
    read ahead, write behind, lock caching, etc.
    Any operation that could previously only be
    used by an exclusive open can now be used on
    an OPlocked sharing open.
    If the user subsequently closes the file then
        The OPbatch file is pseudo-closed
        No network transaction happens
```

While the file is OPbatched, the server may decide to disallow the OPbatched status. This could include another client opening the same file, renaming the same file, deleting the same file or changing the attributes of the file. This is done by having the server send a break_oplock message to the workstation that has the file OPbatched.

When a break_oplock message is received:

If the workstation still has the file open it must immediately:
a) flush any write_behind data to the server
b) flush any cached locks to the server
c) invalidate any read ahead data
d) send an oplock_broken message to the server
e) send a close protocol if the batch file is in the pseudo-closed state The workstation still has the file open, he just cannot use any of the buffering algorithms (read ahead, etc.) any more.

If the workstation receives a break_oplock message for a file that is not opened and not pseudo-closed, it is assumed that the workstation's close of the file crossed the break_oplock message on the wire. The break_oplock message is ignored.

If the workstation receives a break_oplock message for a file that is psuedo-closed, the workstation flushes any cached locks or write behind data and then really closes the file at the server.

Server:

When the server receives an open with OPlock request:

1) if this is the first opener of the file, the OPlock request is granted.

2) if this is the second opener of the file, and the first opener has the file OPlocked, the server sends a break OPlock message to the workstation holding the OPlocked file. This workstation will then dump his write_behind data and any cached locks back to the server. This data is followed by an oplock_broken message. After the oplock_broken message is received by the server, the server will send the second opener an open but not OPlocked response.

The workstation holding the OPlock is not required to respond with a break OPlock message. Instead, the workstation may simply respond by closing the file. In this case the second opener will now be the only opener and will receive the OPlock.

3) If any other opens are received while a break OPlock is in progress, these open requests are simply queued until the break OPlock operation is complete. At this time they will be processed as normal through steps 1 and 2. The result will be sending opened but not OPlocked responses to any open that was pending.

where:

read ahead data: In accordance with the principles of the present invention, if a client requests, for example, ten bytes of data, a workstation local buffer is set up, i.e., 4 K in size, and 4 K of data is sent to the local buffer. The buffer is set up in the workstation redirector with the expectation that the user will eventually need this data. The next time a request for the data is made, it can be handled locally without accessing the file server. This is used in the exclusive mode and the OPlocked exclusive mode.

write behind data: In accordance with the principles of the present invention, if the client writes or saves small amounts of data it is stored in a workstation local buffer until the buffer is full. Once the buffer is filled, the data is transmitted to the server. This is used in the exclusive mode and the OPlocked exclusive mode.

lock caching: The system of the present invention tracks locks placed on a file locally. If it is known that a file is OPlocked, the lock is not sent to the file server. If in the sharing mode, the locked bytes are sent to the file server. When in the sharing mode an application may make a call to lock certain bytes to lock them while they are being modified. For example, in the sharing mode, locked requests are sent to the file server to get certain records to modify. Once the records are modified, the records are sent back to the file server with an unlock request. File lock and unlock requests are a feature of the well-known MS-DOS operating system as well as many other operating systems.

cached locks: locks that are present locally in a workstation and have not been sent to the file server. In other words, the client believes the locked range is locked.

The OPlocking/OPbatching process of the present invention is further described in conjunction with FIGS. 3-9. FIG. 3A illustrates the message traffic on a local area network when batch files are remotely executed in a prior systems. In the description below, the abbreviation "SMB" refers to a server message block which is discussed in detail below. The process 300 is entered whenever a open batch file SMB is received from a workstation as represented by SMB1. The file server then responds with SMB2 indicating that the file is open and available. The workstation then generates SMB3 instructing the file server to seek for the requested line of the batch file. Once the requested line of the batch file is found, the file server generates SMB4 confirming the requested line in the batch file has been found. The workstation then generates a read request to read the line in the batch file as indicated by SMB5. The file server responds by sending the requested data to the workstation as indicated at line SMB6. Once the data is received from the file server, the workstation generates message SMB7 instructing the file server to close the batch file. When complete, the file server generates SMB8 confirming the file is closed. Thus, every executable line in a batch file requires a total of eight network messages for execution in prior networked systems.

Figure 3A:
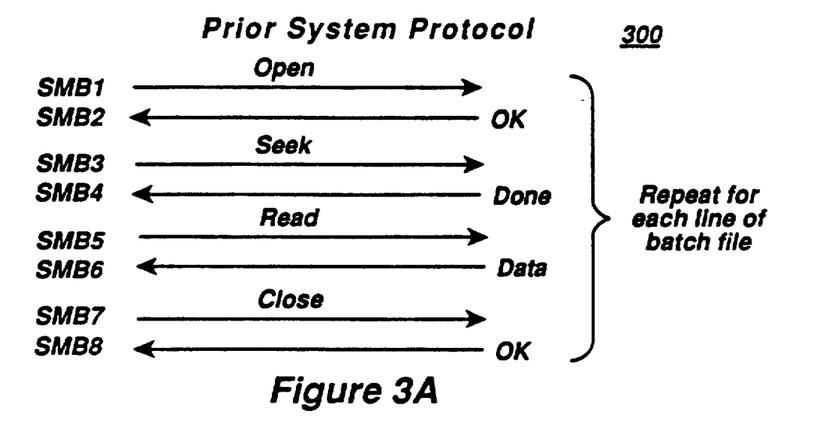
FIG. 3A is a diagram showing the communication between a file server and a workstation and a file server in a prior art networked computer system.
Figure 3B:
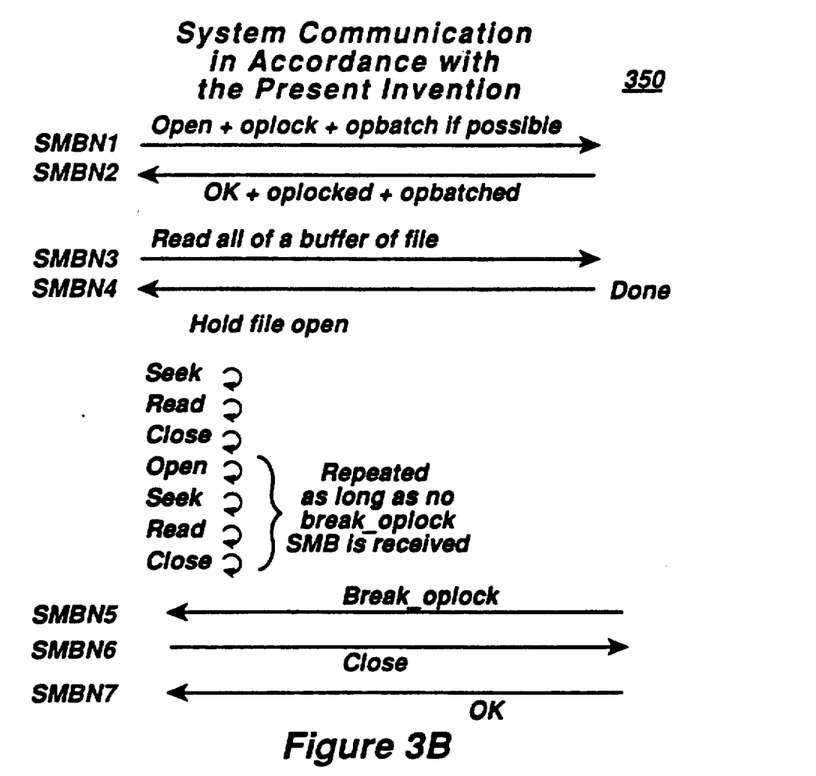
FIG. 3B is a diagram showing the communication between a file server and a workstation in accordance with the principles of the present invention.

Referring now to FIG. 3B, the overall operation of the present invention is described. The process 350 is invoked whenever a workstation requests batch file services in a sharing mode. The sharing mode request is automatically converted to a request for opening the batch file in an OPlocked/OPbatched mode and the workstation sends this request to the file server as indicated by SMBN1. If the batch file is not currently open, file server responds with SMBN2, indicating the file is available and open in the OPlocked/OPbatched mode. The workstation then generates SMBN3 which instructs the file server to send a requested batch file (or portion thereof) to the workstation. The file server responds with SMBN4 which contains the requested batch file data. The batch file is then held open on the file server and the batch file is cached and processed locally in the workstation until the batch file is entirely executed or until it is requested by another user. If the batch file is requested by another user while the batch file is OPlocked/OPbatched, the file server generates SMBN5 instructing the workstation to exit the OPlocked mode and the workstation responds with SMBN6 by sending the batch file back to the file server and closing the file. The file server then responds with SMBN7 when the operation is complete and the system reverts to the normal sharing mode. Accordingly, in the OPlocked/OPbatched mode of the present invention, a total of seven network messages are required to execute an entire batch file. In contrast, in the sharing mode of the prior art, a total of eight network messages are required to execute every line in the batch file. In addition, the present invention provides all the advantages of conventional sharing mode operation by automatically reverting to the sharing mode if the batch file is requested by another client.

Figure 4:
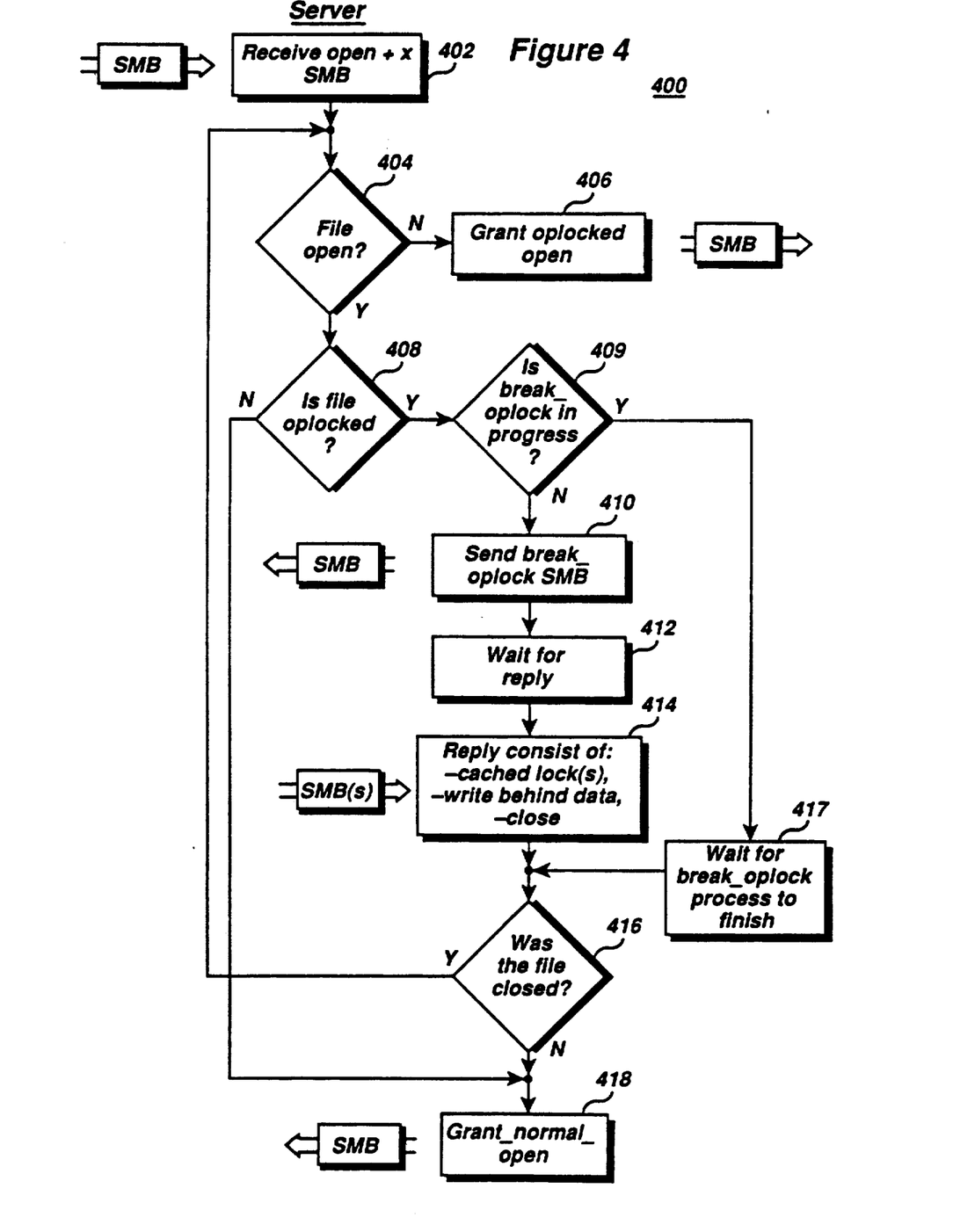
FIG. 4 is a flow diagram detailing the operation of the file server of the present invention when opening file server files in accordance with the principles of the present invention.

FIG. 4 is a flow diagram of the operation of the file server portion of the system operating in accordance with the principles of the present invention when OPlocking a requested file. As will be discussed below, the present invention is adapted for use with the Server Message Block (SMB) protocol developed by Microsoft, IBM, and Intel. For the purposes of the discussion below, SMBs refer to message packets sent between the server and workstations over LAN communication lines. The process 400 is invoked when an open file SMB is received from a system workstation as indicated by item 402. The open file SMB includes a request to open the file in the OPlocked/OPbatched exclusive mode. Control then passes to decision 404 to determine whether the requested file has already been opened by another workstation. If not, item 406 is invoked to generate an SMB granting the file open request in an exclusive OPlocked mode. SMB requests typically include a desired operation such as open, as well as another operation such as a request to read a designated block of data. For example, an SMB request may be a request to open and read, open and write, read and lock, etc. Therefore, the SMB message returned includes the SMB instruction along with the file handle and the requested data.

Once a return SMB is generated in item 406, the SMB is sent to the requesting workstation via the LAN communication lines. If the requested file is currently open, control passes to decision 408 to determine whether the open file is OPlocked. If not, control is passed to item 418 to generate a "grant normal open" SMB. If decision 408 determines the file is OPlocked, control is passed to decision 409 to determine whether a break—oplock function is in process. If so, control is passed to item 417 to wait until the break—oplock process is complete. Once complete, control passes to item 418 to generate a grant—normal—open SMB. If decision 409 determines a break—oplock function is not in process, control is passed to item 410 to generate and send a "break—oplock" SMB to the original file opener. Control then passes to item 412 to wait for a reply SMB. The reply SMB is received by item 414 wherein the reply may consist of any combination of cached locks, write behind data or a close instruction. Control then passes to decision 416 to determine whether the SMB contained a file close instruction. If so, control returns to decision 404. If not, control is passed to item 418 described above.

Figure 5:
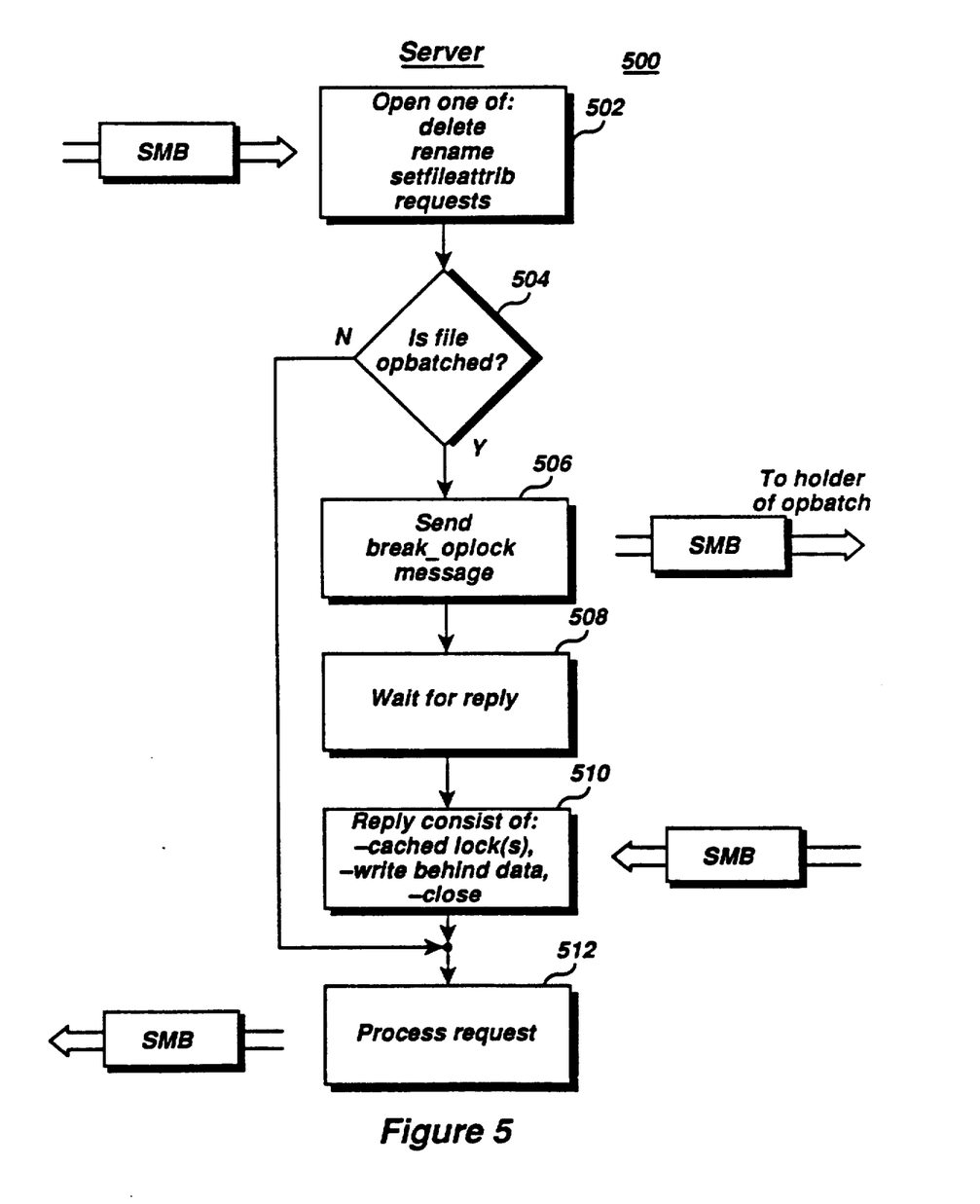
FIG. 5 is a flow diagram showing the operation of a file server operating in accordance with the principles of the present invention when performing batch file operations such as renaming, or deleting batch files, etc.

FIG. 5 is a flow diagram of the operation of the file server portion of the system operating in accordance with the principles of the present invention when OPbatching a requested file. The process 500 is invoked when an OPbatching request SMB is received from a workstation. An OPbatching request is typically generated whenever a batch file function such as deleting, renaming, or any request which would modify the file is requested by a client. The request SMB is received by item 502. Decision 504 then determines whether the file is currently OPbatched by another client. If not, control passes to item 512 which processes the workstation request and generates a response SMB. If the requested file is OPbatched, control passes to item 506 which sends an SMB to the workstation holding the OPbatched file, instructing the workstation to break OPlock. Control then passes to item 508 to wait for a reply. Once the reply SMB is received, control passes to item 510 to process the SMB and update the batch file on the file server. Control then passes to item 512, as described above.

Figure 6A:
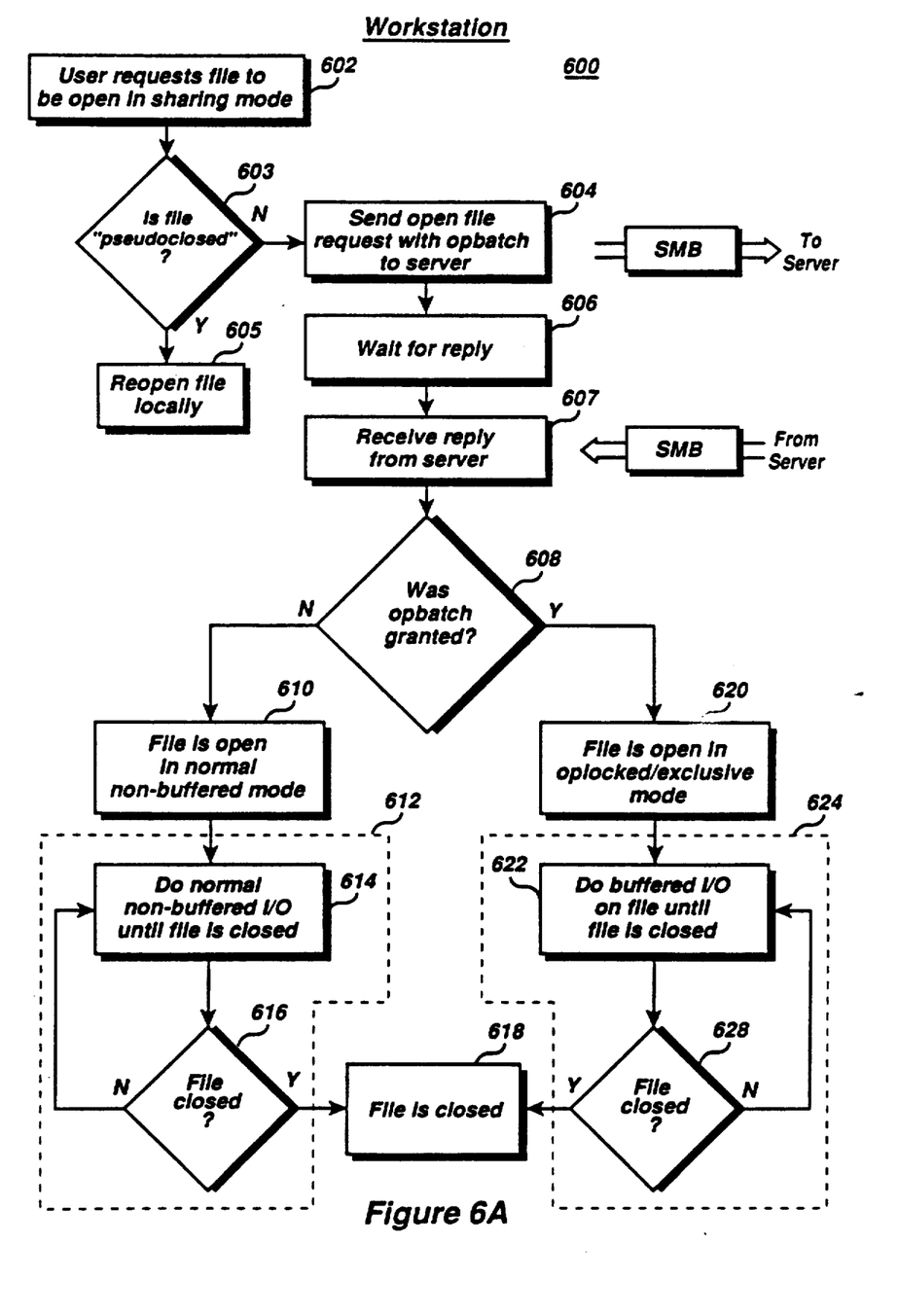
FIG. 6A is a flow diagram which describes the operation of the workstations of the present invention when requesting a file to be opened in the OPlocked exclusive mode.

FIG. 6A is a flow diagram which describes the operation of the workstations of the present invention when requesting a file to be opened in the OPlocked/OPbatched exclusive mode. The OPbatched portion of workstation operation is described in conjunction with FIGS. 8 and 9. The routine 600 is invoked whenever a client requests operation in a sharing mode as indicated by item 602. Decision 603 determines whether the file is pseudo-closed. If so, control passes to item 605 to re-open the file locally. If not, control then passes to item 604 wherein the workstation redirector converts this request into a request to open a file in the exclusive OPlocked mode, generate the appropriate SMB, and send the SMB to the file server via the LAN communication lines. Control then passes to item 606 wherein the workstation waits for a reply. Once a reply is received, control passes to item 608 to decode the SMB message from the server. Decision 608 then determines whether the OPlock request was granted. If not, control passes to item 610 wherein the file is open in a normal nonbuffered sharing mode. Control then passes to loop 612 which comprises item 614 and decision 616. Item 614 is invoked to perform system I/O until the file is closed. Decision 616 determines whether the file is closed or if a break_oplock SMB is generated by process 700. If decision 616 determines that the file is not closed, control loops back to item 614. If decision 616 determines the file is closed, control passes to item 618 which indicates the file is closed.

If decision 608 determines OPlock was granted, control passes to item 620 which indicates the file is open in the OPlocked exclusive mode. Control then passes to item 622 which allows buffered operations such as read ahead, write behind and lock caching. Loop 624 is then invoked. Loop 624 comprises item 622, which performs buffered I/O on the open file until it is closed. Decision 630 determines whether the file is closed. If decision 628 determines that the file is not closed, control loops back to item 622. If decision 628 determines the file is closed, control passes to item 618, which indicates the file is closed. Note: loop 624 can be modified if a asynchronous break_oplock request (detailed in FIG. 7) is received.

Figure 6B:
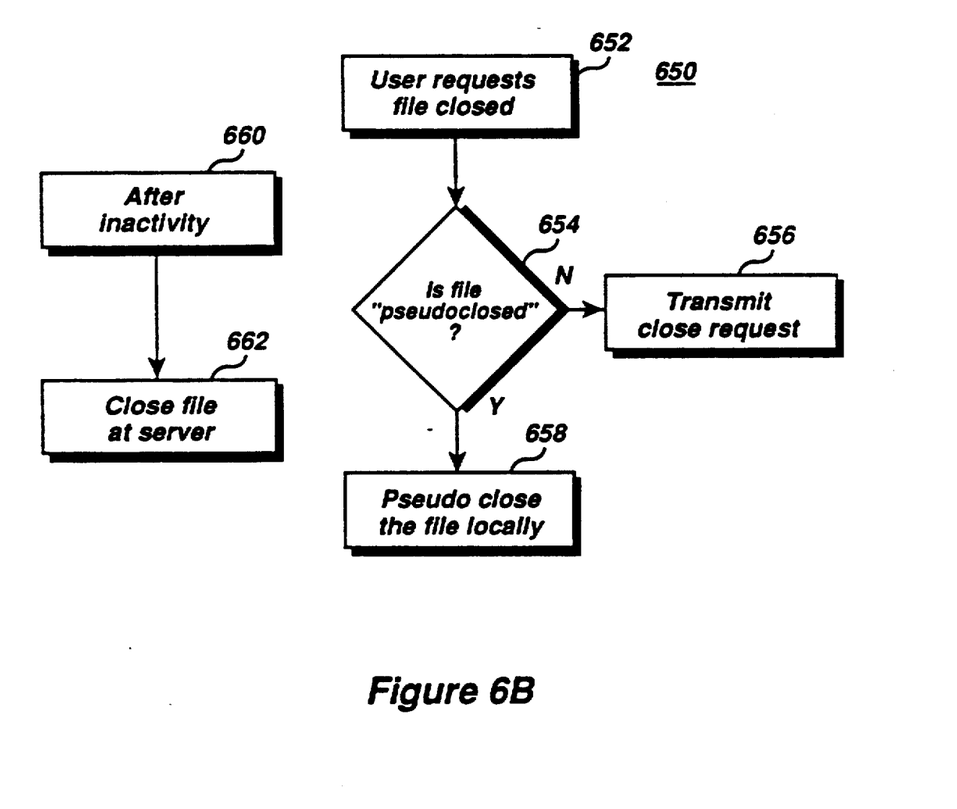
FIG. 6B is a flow diagram which describes the operation of the present invention when a user requests a file to be closed.

Referring now to FIG. 6B, the process 650 is invoked whenever a user requests a file close operation as indicated by item 652. Decision 654 then determines whether the file is OPbatched. If not, item 656 transmits a close request. If so, control passes to item 658 to pseudo-close the file locally. Item 660 represents a file server timer wherein after a predetermined time interval of inactivity, control will pass to item 662 to close the file at the server.

Figure 7:
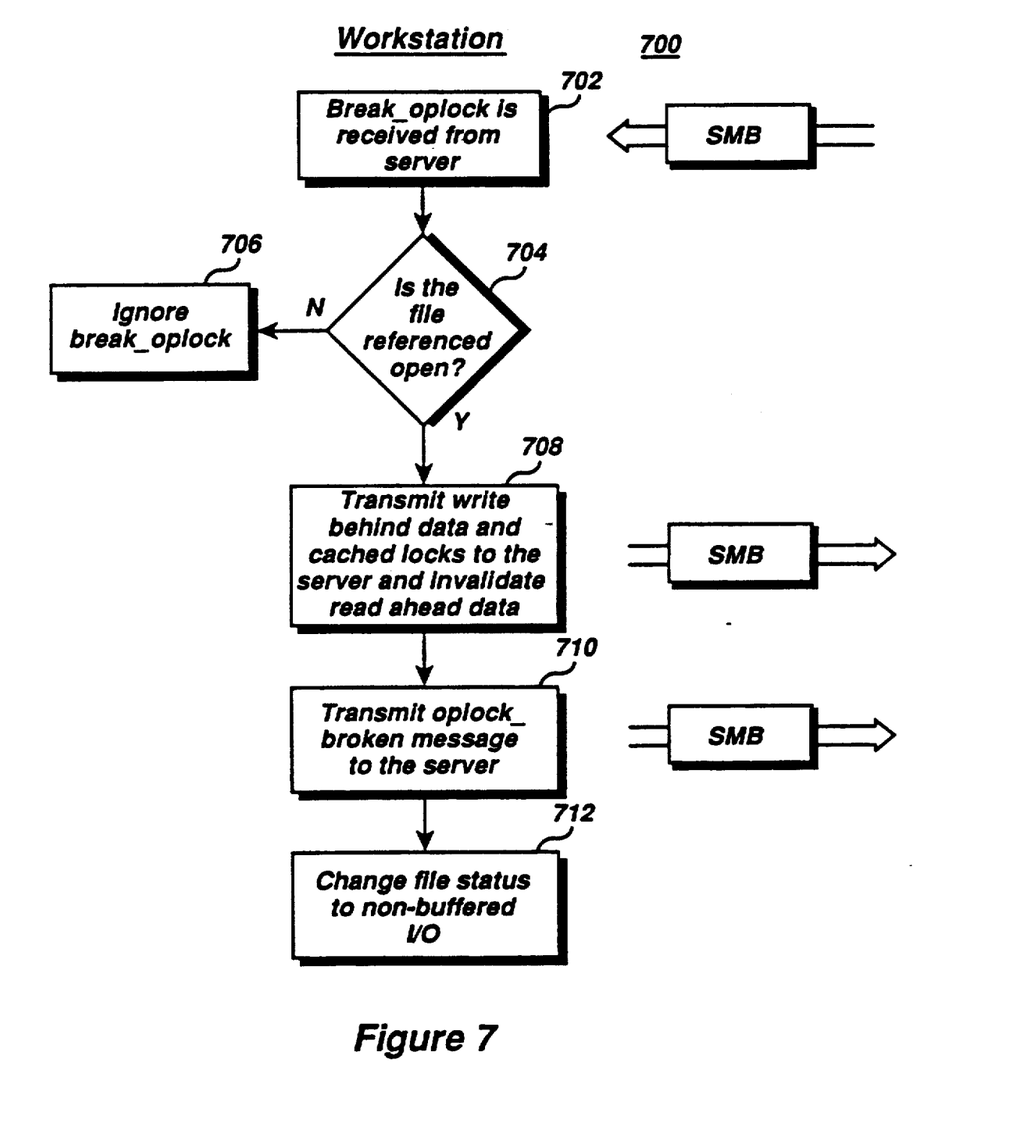
FIG. 7 is a flow diagram which describes the operation of the workstations of the present invention when the OPlocked exclusive mode operation must be terminated.

FIG. 7 is a flow diagram which describes the operation of the workstations of the present invention when the OPlocked exclusive mode operation must be terminated. The process 700 is invoked when a break_oplock SMB is received from the file server as indicated by item 702. Decision 704 then determines whether the referenced file is open. If not, the break_oplock SMB is ignored in item 706. If the referenced file is open, control passes to item 708 which transmits any write behind data and cached locks to the server and which invalidates any read ahead data. Control then passes to item 710 which transmits an oplock_broken SMB to the file server to indicate OPlock is broken and the workstation reverts to the sharing mode in item 712 by changing the file status to operate in a nonbuffered I/O mode.

Figure 8:
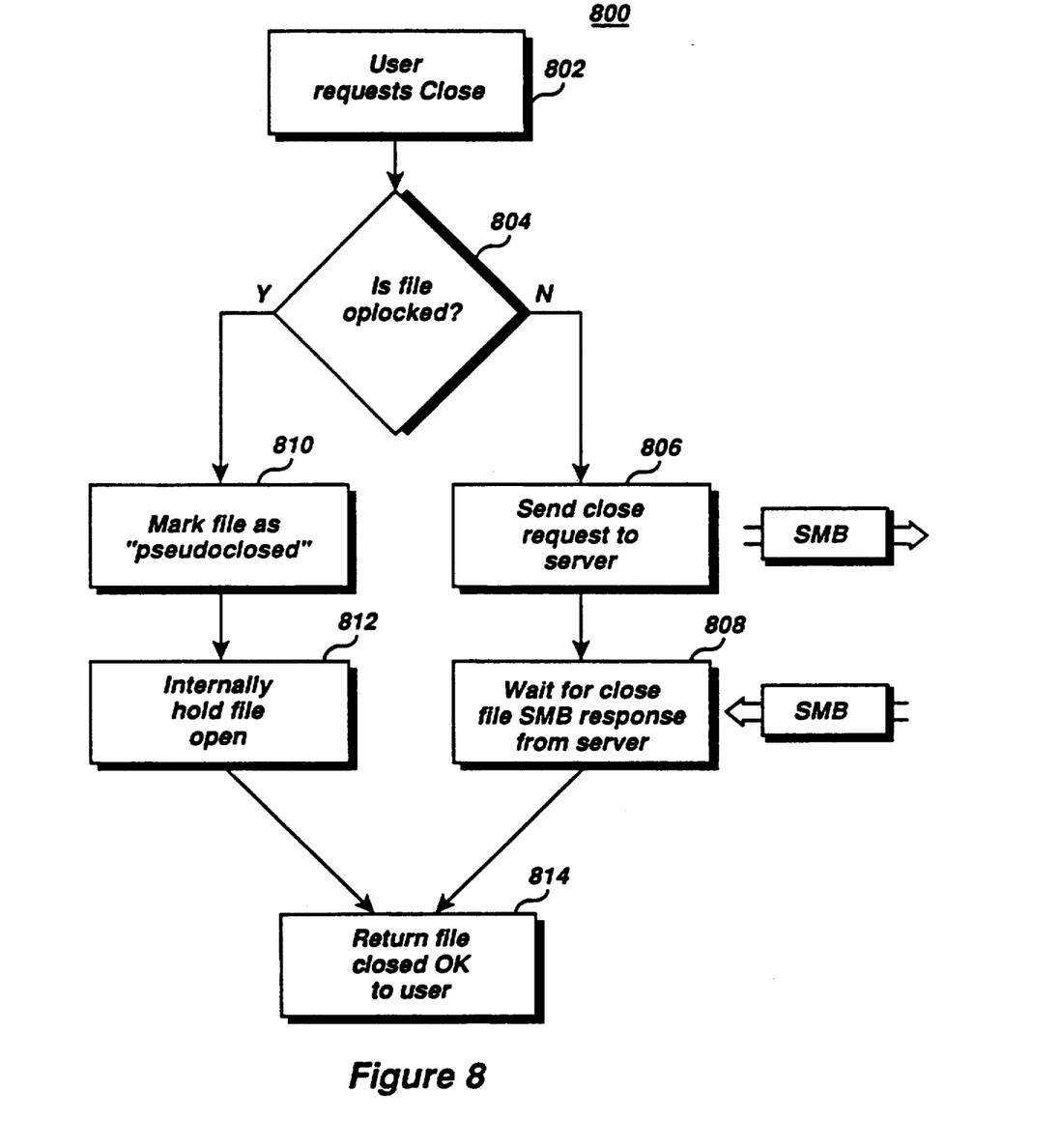
FIG. 8 is a flow diagram showing the operation of a remote workstation when closing batch files in accordance with the principles of the present invention.

FIG. 8 is a flow diagram showing the operation of a remote workstation when closing batch files in accordance with the principles of the present invention. The process 800 is invoked whenever a user or client requests a file be closed in item 802 or whenever the workstation is closing the batch file while executing the batch file. Control then passes to decision 804 which determines whether the file is currently OPlocked. If the file is not currently OPlocked, control passes to item 806 which sends a close SMB to the file server. Control then passes to item 808 wherein an SMB is received from the file server indicating the file is closed.

If decision 804 determines the file is OPlocked, control passes to item 810 to internally mark the file closed in the workstation. Control then passes to item 812 where the file is held internally.

Figure 9:
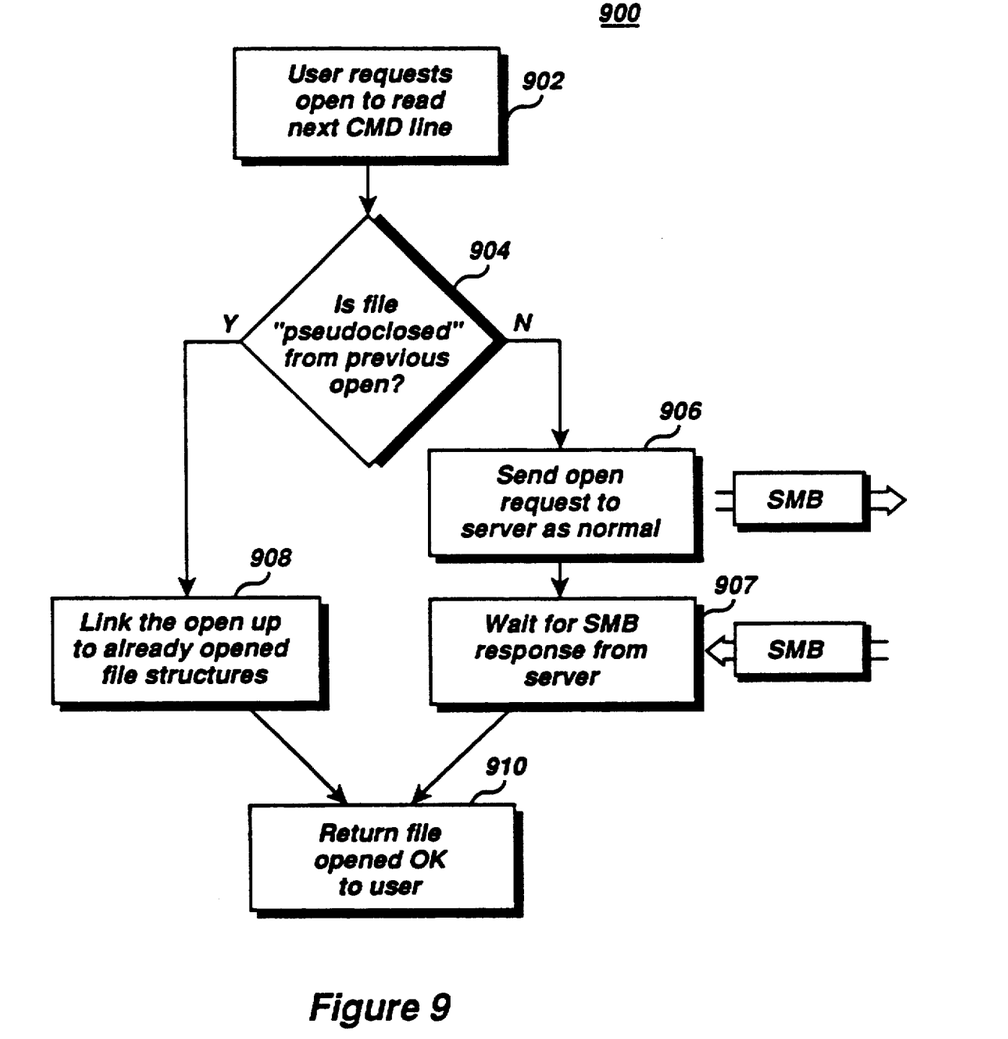
FIG. 9 is a flow diagram showing the operation of a remote workstation when executing batch files in accordance with the principles of the present invention

FIG. 9 is a flow diagram showing the operation of a remote workstation when executing batch files in accordance with the principles of the present invention. The process 900 is invoked in item 902 wherein a user or client requests an open to read the next command line in a batch file. Decision 904 then determines whether the batch file is pseudo-closed from a previous open, i.e., the file is OPbatched and being executed locally. If the batch file is not OPbatched, control passes to item 906 to send an open SMB to the file server. Control then passes to item 910 wherein "file open OK" is returned to the user. If decision 904 determines the batch file is OPbatched, control passes to item 908 to link the open request to the file structure already open and control passes to item 910.

Based on the description above, it will be readily apparent to those of ordinary skill in the art that the present invention may be implemented with any of a number of well-known LAN protocols. However, the present invention is particularly adapted for use with the Server Message Block (SMB) file sharing protocol. The SMB file sharing protocol is described in detail in a document "Microsoft Networks/OpenNET File Sharing Protocol," Intel part Number 138446, Microsoft Corp., 1985, and a document "SMB File Sharing Protocol Extensions," Microsoft Corp., 1988, both of which are incorporated herein by reference. References to the OPlocking technique of the present invention may be found in the 1988 Microsoft document, pp. 3, 4, 46–48 and 51–58. It should be noted that references to the present invention in the document were printed less than one year prior to the filing date of the present application.

In summary, a method and means for improving the performance of a distributed computer system has been described. In accordance with the principles of the present invention, a distributed computer system comprises a plurality of workstations and a file server. The workstations of the present invention are adapted to operate in a sharing mode, an exclusive mode and an OPlocked/OPbatched exclusive mode. In the sharing mode and exclusive mode, the workstations of the present invention operate in a conventional manner. However, in the OPlocked/OPbatched exclusive mode, requests for opening batch files in the sharing mode are automatically converted into requests for opening files in the OPlocked/OPbatched exclusive mode. If the requested file has not already been opened by another workstation, the batch file open request is granted for OPlocked/OPbatched exclusive mode operation wherein the batch file, or portions of the batch file, are transferred from the file server to the requesting workstation where it is cached and executed locally. During this period, the batch file is held open on the file server. If another workstation generates a request to open an OPlocked/OPbatched file, the workstation holding the batch file open in the OPlocked/OPbatched exclusive mode transfers its cached data back to the file server and reverts to the conventional sharing mode. Accordingly, other uses and modifications of the present invention will be readily apparent to persons of ordinary skill in the art without departing from the spirit and scope of the present invention. All of such uses and modifications are intended to fall within the scope of the appended claims.

What is claimed is:

1. A method of executing multiple batch file commands from a remote terminal, comprising the steps of:
   (a) caching a batch file having the multiple batch file commands from a file server to the remote terminal;
   (b) opening the batch file within the remote terminal when no other remote terminal has opened or requested to open the batch file; and
   (c) locally processing any number of the multiple batch file commands within the remote terminal without closing or deleting the batch file within the remote terminal so long as no other terminal has opened or requested to open the file.

2. The method according to claim 1, further comprising the step of (d) closing and deleting the batch file within the remote terminal after a predetermined time has expired since the batch file has been requested to be closed by the application program.

3. A remote terminal in a network for executing multiple batch file commands, comprising:
   means for caching a batch file having the multiple batch file commands from a file server to the remote terminal;
   means for opening the batch file within the remote terminal when no other remote terminal has opened or requested to open the file; and
   means for locally processing any number of the multiple batch file commands within the remote terminal without closing or deleting the batch file within the remote terminal so long as no other terminal has opened or requested to open the file.

4. A remote terminal according to claim 3, further comprising means for closing and deleting the batch file within the remote terminal after a predetermined time has expired since the read batch file has been requested to be closed by the application program.

5. The method of claim 1 wherein step (a) comprises receiving the initial request from an application program, and wherein the step of (c) locally processing the multiple batch file commands comprises establishing access to the read batch file contents upon receiving a subsequent request by the application program to open the batch file.

6. The method of claim 1 step (a) comprises receiving the initial request from an application program, and wherein the step of (c) locally processing the multiple batch file commands comprises converting a subsequent request by the application program to open the batch file in the file server to a request to open the read batch file within the remote terminal.

7. The remote terminal of claim 4 wherein the means for locally processing the multiple batch file commands comprises means for establishing access to the read batch file contents upon receiving a subsequent request by an application program to open the batch file.

8. The remote terminal of claim 4 wherein the means for locally processing the multiple batch file commands comprises means for converting a subsequent request by an application program to open the batch file in the file server to a request to open the read batch file within the remote terminal.

* * * * *